United States Patent
Croak et al.

(10) Patent No.: US 7,995,464 B1
(45) Date of Patent: Aug. 9, 2011

(54) METHOD AND APPARATUS FOR MEASURING QUALITY OF SERVICE LEVELS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1660 days.

(21) Appl. No.: 11/168,652

(22) Filed: Jun. 27, 2005

(51) Int. Cl.
*H04L 12/26* (2006.01)
*H04L 12/56* (2006.01)
*G06F 15/173* (2006.01)

(52) U.S. Cl. ... 370/218; 370/225; 370/238; 370/395.21; 370/395.32; 709/239; 709/241

(58) Field of Classification Search .......... 370/218, 370/225, 238, 395.21, 395.32; 709/239, 709/241
See application file for complete search history.

(56) References Cited

U.S. PATENT DOCUMENTS

| | | | | |
|---|---|---|---|---|
| 5,408,465 A * | 4/1995 | Gusella et al. | ............... | 370/231 |
| 5,987,011 A * | 11/1999 | Toh | ............... | 370/331 |
| 5,995,503 A * | 11/1999 | Crawley et al. | ............... | 370/351 |
| 6,157,840 A * | 12/2000 | Hogberg et al. | ........... | 455/452.2 |
| 6,181,684 B1 * | 1/2001 | Turcotte et al. | ............... | 370/332 |
| 6,269,330 B1 * | 7/2001 | Cidon et al. | ............... | 714/43 |
| 6,349,111 B1 * | 2/2002 | Huloux | ............... | 375/222 |
| 6,597,684 B1 * | 7/2003 | Gulati et al. | ............... | 370/351 |
| 6,631,122 B1 * | 10/2003 | Arunachalam et al. | ....... | 370/332 |
| 6,643,508 B1 * | 11/2003 | Shi | ............... | 455/428 |
| 6,721,270 B1 * | 4/2004 | Mitra et al. | ............... | 370/230 |
| 6,816,464 B1 * | 11/2004 | Scott et al. | ............... | 370/252 |
| 6,912,232 B1 * | 6/2005 | Duffield et al. | ............... | 370/468 |
| 6,934,249 B1 * | 8/2005 | Bertin et al. | ............... | 370/218 |
| 6,934,258 B1 * | 8/2005 | Smith et al. | ............... | 370/238 |
| 6,958,974 B1 * | 10/2005 | Prehofer | ............... | 370/235 |
| 6,965,575 B2 * | 11/2005 | Srikrishna et al. | ............ | 370/252 |
| 7,002,917 B1 * | 2/2006 | Saleh | ............... | 370/238 |
| 7,020,087 B2 * | 3/2006 | Steinberg et al. | ............ | 370/238 |
| 7,024,163 B1 * | 4/2006 | Barratt et al. | ............... | 455/69 |
| 7,120,118 B2 * | 10/2006 | Rajagopal et al. | ............ | 370/237 |
| 7,209,472 B2 * | 4/2007 | Ohta et al. | ............... | 370/351 |
| 7,299,038 B2 * | 11/2007 | Kennedy et al. | ........... | 455/422.1 |
| 7,339,934 B2 * | 3/2008 | Mussman et al. | ....... | 370/395.21 |
| 7,346,045 B2 * | 3/2008 | Montes Linares | ............ | 370/352 |
| 7,382,765 B2 * | 6/2008 | Kennedy et al. | ............... | 370/351 |
| 7,404,005 B1 * | 7/2008 | Burton et al. | ............... | 709/238 |
| 7,453,864 B2 * | 11/2008 | Kennedy et al. | ............... | 370/351 |
| 7,593,321 B2 * | 9/2009 | Galand et al. | ............... | 370/218 |
| 7,715,312 B2 * | 5/2010 | Khasnabish et al. | .......... | 370/230 |
| 7,756,138 B2 * | 7/2010 | Dhesikan et al. | ....... | 370/395.21 |
| 2004/0032853 A1 * | 2/2004 | D'Amico et al. | ............ | 370/349 |
| 2004/0032876 A1 * | 2/2004 | Garg et al. | ............... | 370/443 |
| 2004/0246945 A1 * | 12/2004 | Knaebchen et al. | ......... | 370/352 |
| 2006/0285489 A1 * | 12/2006 | Francisco et al. | ............ | 370/229 |

FOREIGN PATENT DOCUMENTS

EP 0892569 A2 * 1/1999

* cited by examiner

*Primary Examiner* — Alpus H Hsu

(57) ABSTRACT

A method and apparatus for measuring quality of service levels for a plurality of alternative routes in a packet network is described. In one example, a plurality of alternative routes associated with at least one termination point is determined. The quality of service level for each of the plurality of alternative routes associated is then measured. Lastly, a primary alternative route is selected from the plurality of alternative routes based on the quality of service level.

20 Claims, 4 Drawing Sheets

METHOD AND APPARATUS FOR MEASURING QUALITY OF SERVICE LEVELS

BACKGROUND OF THE INVENTION

1. Field of the Invention

Embodiments of the present invention generally relate to telecommunications systems and, more particularly, to a method and apparatus for measuring quality of service (QoS) levels in a packet network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network. Notably, call control elements in VoIP networks can provide a list of alternative routes for completing calls as a function of pre-specified criteria such as least cost, least hops, and geographical proximity. Depending on the active criteria, ordered routes are returned to the call control element and connections to endpoints are attempted. However, the list of alternative routes is typically not prioritized in accordance with a quality of service level or some other measure of service quality.

Thus, there is a need in the art for a method and apparatus for measuring quality of service levels across alternative routes in a packet network.

SUMMARY OF THE INVENTION

In one embodiment, a method and apparatus for measuring quality of service levels for a plurality of alternative routes in a packet network is described. More specifically, a plurality of alternative routes associated with at least one termination point is determined. The quality of service level for each of the plurality of alternative routes associated is then measured. Lastly, a primary alternative route is selected from the plurality of alternative routes based on the quality of service level.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
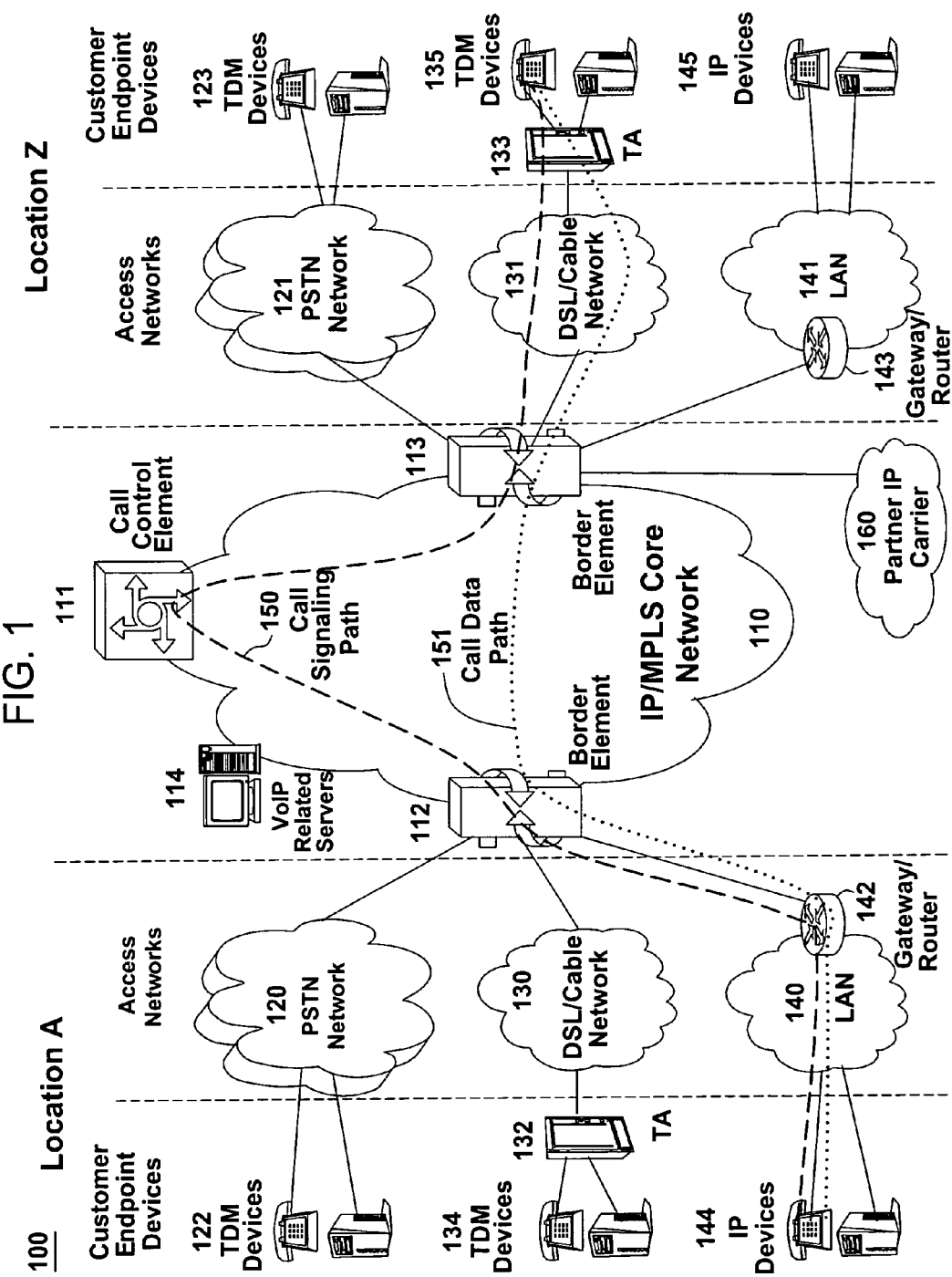
FIG. 1 is a block diagram depicting an exemplary embodiment of a communication system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
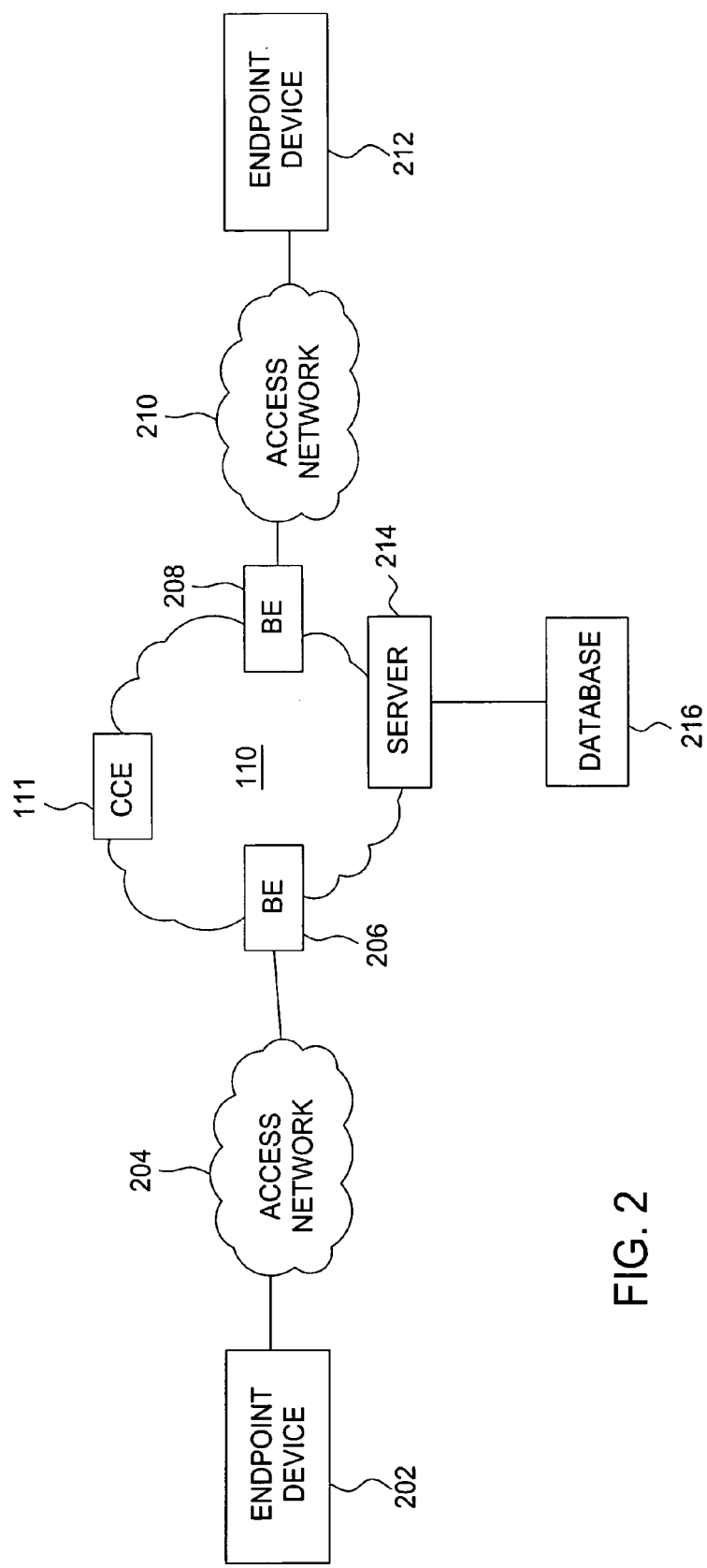
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and border element (BE) 206. An endpoint device 212 is configured for communication with the core network 110 via an access network 210 and BE 208. The endpoint device 202 and the endpoint device 212 may comprise any of the customer endpoint devices described above (e.g., TDM devices, IP devices, etc.). The access networks 204 and 210 may comprise any of the access networks described above (e.g., PSTN, DSL/Cable, LAN, etc).

The core network 110 further includes a server 214 in communication with a database 216. In one embodiment of the present invention, the server 214 is a network routing engine (or is a server that executes routing software). The server 214 is responsible for several tasks, which include receiving queries from the CCE 111, deploying probes to measure quality of service (QoS) levels in alternative or "candidate" routes to a particular termination point (e.g., at least one probe per route). The database 216 may be any type of electronic collection of data that is well known in the art. Depending on the embodiment, the database 216 stores various QoS measurements associated with alternative routes that are taken by the server 214.

In one embodiment, the present invention is utilized to measure the quality of service levels for a plurality of alternative routes in a packet network. Typically, the CCE 111 queries the server 214 to obtain a set of alternative routes for completing a call to a particular endpoint device (e.g., endpoint device 212). The server 214 then determines the set of alternative routes for completing a call to a particular endpoint device based on criteria such as least cost, least number of hops, geographical proximity, and/or the like. Once the routes are selected based on this criteria, the server 214 deploys probes across each of the selective routes in order to test QoS levels. Once the QoS levels are measured, the respective alternative routes are stored in a database 216 with their associated QoS data. The server 214 then accesses the database 216 and selects the best alternative route based on its QoS level (e.g., the highest QoS level). This route is then provided to the CCE 111.

Figure 3:
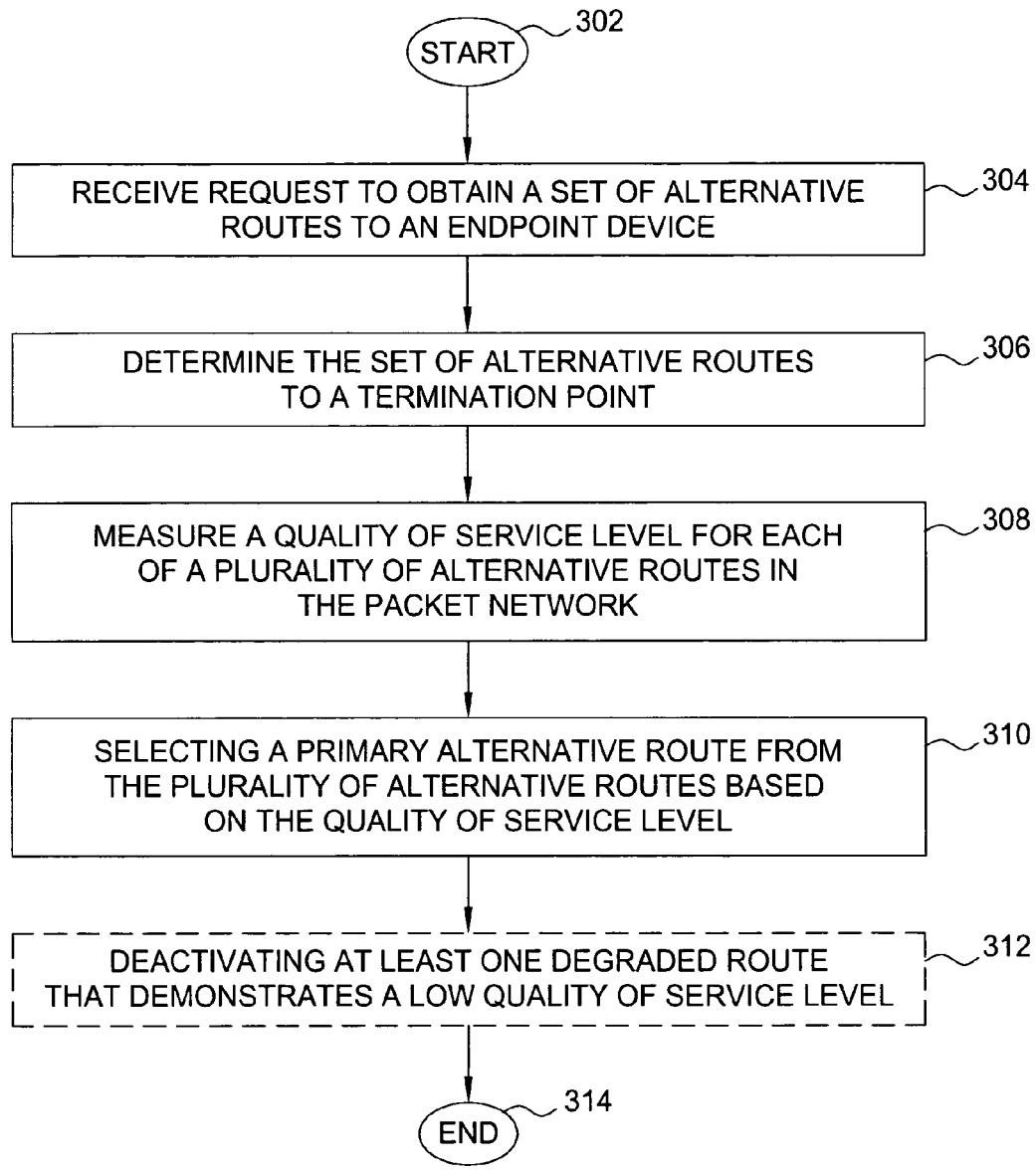
FIG. 3 is a flow diagram depicting an exemplary embodiment of a method for measuring quality of service levels in a packet network in accordance with one or more aspects of the invention.

FIG. 3 is a flow diagram depicting an exemplary embodiment of a method 300 for measuring quality of service (QoS) levels in a packet network in accordance with one or more aspects of the invention. The method 300 begins at step 302. At step 304, a request to obtain a set of alternative routes for completing a call to an endpoint device is received. In one embodiment, the CCE 111 queries the server 214 (or a network routing engine) for the alternative routes. At step 306, the set of alternative routes to a termination point associated with the endpoint device is determined. The selection of the alternative routes may be based on criteria such as least cost, least number of hops, geographical proximity, and the like. In one embodiment, the termination point may include an access network (or border element in the access network), a terminal adapter, or an endpoint device. In another embodiment, step 306 may be performed prior to step 304.

At step 308, the quality of service level for each of the selected alternative routes in the packet network is measured. In one embodiment, a network routing engine (e.g., server 214) deploys a plurality of probes across the alternative routes. A probe may comprise any software based mechanism that is initially transmitted to a network component, access network, endpoint device, or any other termination point and subsequently receives data in return. This mechanism may function in a manner not unlike a ping utility. The probe is utilized to measure various aspects of a given route such as the quality of service level. Criteria such as packet delay, jitter rates, packet loss, and the like all contribute towards a route's QoS level. Once these measurements are made, the alternate routes and their associated QoS levels are typically saved in some storage medium (e.g., database 216) by the server 214. In another embodiment, step 308 may be performed prior to step 304.

At step 310, a primary alternative route is selected from the plurality of alternative routes based on the quality of service level. In one embodiment, a network routing engine (e.g., server 214) accesses the database 216 containing the plurality of alternative routes and selects the route with the highest quality of service level. The route with the highest QoS level is designated as the primary (e.g. "first") alternative route and is ultimately provided to the CCE 111.

In one embodiment, the method 300 continues to step 312 where at least one degraded route, which demonstrates a low QoS level, is deactivated. For example, the network routing engine may access the database 216 and discover that a particular alternative route(s) associated with a termination point continuously exhibits a low QoS level. Notably, this is possible by referencing database 216, which may store a history or log of QoS levels for various routes in order to display past performance trends. Upon ascertaining that a particular route (s) is demonstrating poor QoS levels (e.g., QoS levels that do not exceed a predefined threshold level) the routing engine may deactivate that route so that further connections will not utilize the substandard call path. The method 300 continues to step 314 and ends.

Figure 4:
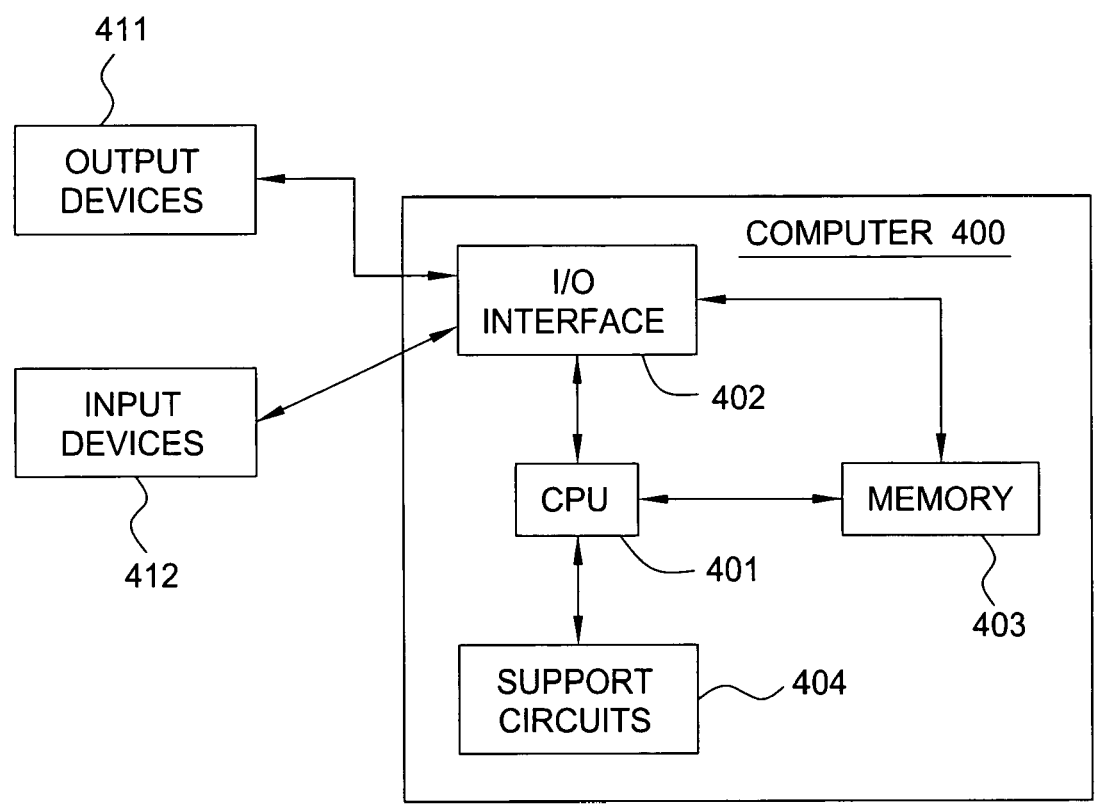
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 may be used to implement the server 214 of FIG. 2. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, display, and the like.

The memory 403 may store all or portions of one or more programs and/or data to implement the processes and methods described herein. Notably, the memory 403 may store QoS measuring software to select a primary alternative route from a plurality of alternative routes, as described above. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for selecting a first alternative route from a plurality of alternative routes in a packet network, comprising:
   receiving a call setup message intended for a termination point;
   determining the plurality of alternative routes associated with the termination point, wherein each of the plurality of alternative routes has a measured quality of service level;
   selecting the first alternative route from the plurality of alternative routes, wherein the first alternative route has a highest quality of service level; and
   deactivating a degraded route that demonstrates a low level quality of service level, wherein the degraded route is determined from a database that stores a history of quality of service level for the degraded route.

2. The method of claim 1, wherein the packet network comprises an internet protocol network.

3. The method of claim 1, wherein the termination point comprises an endpoint device.

4. The method of claim 1, wherein the measured quality of service level is based on a packet delay.

5. The method of claim 1, further comprising:
   measuring the measured quality of service level for each of the plurality of alternative routes prior to selecting the first alternative route with a probe.

6. The method of claim 1, further comprising:
   receiving a request at a routing engine from a call control element to determine the plurality of alternative routes associated with the termination point after receiving the call setup message.

7. The method of claim 1, wherein the termination point comprises a terminal adapter.

8. The method of claim 1, wherein the termination point comprises an access network.

9. The method of claim 1, wherein the measured quality of service level is based on a packet loss.

10. A non-transitory computer readable medium having stored thereon instructions that, when executed by a processor, cause the processor to perform a method for selecting a first alternative route from a plurality of alternative routes in a packet network, comprising:
- receiving a call setup message intended for a termination point;
- determining the plurality of alternative routes associated with the termination point, wherein each of the plurality of alternative routes has a measured quality of service level;
- selecting the first alternative route from the plurality of alternative routes, wherein the first alternative route has a highest quality of service level; and
- deactivating a degraded route that demonstrates a low level quality of service level, wherein the degraded route is determined from a database that stores a history of quality of service level for the degraded route.

11. The non-transitory computer readable medium of claim 10, wherein the packet network comprises an internet protocol network.

12. The non-transitory computer readable medium of claim 10, wherein the termination point comprises an endpoint device.

13. The non-transitory computer readable medium of claim 10, wherein the measured quality of service level is based on a packet delay.

14. The non-transitory computer readable medium of claim 10, further comprising:
- measuring the measured quality of service level for each of the plurality of alternative routes prior to selecting the first alternative route with a probe.

15. An apparatus for selecting a first alternative route from a plurality of alternative routes in a packet network, comprising:
- means for receiving a call setup message intended for a termination point;
- means for determining the plurality of alternative routes associated with the termination point, wherein each of the plurality of alternative routes has a measured quality of service level;
- means for selecting the first alternative route from the plurality of alternative routes, wherein the first alternative route has a highest quality of service level; and
- means for deactivating a degraded route that demonstrates a low level quality of service level, wherein the degraded route is determined from a database that stores a history of quality of service level for the degraded route.

16. The apparatus of claim 15, wherein the packet network comprises an internet protocol network.

17. The apparatus of claim 15, wherein the termination point comprises an endpoint device.

18. The apparatus of claim 15, wherein the measured quality of service level is based on a packet delay.

19. The apparatus of claim 15, further comprising:
- means for measuring the measured quality of service level for each of the plurality of alternative routes prior to selecting the first alternative route with a probe.

20. The apparatus of claim 16, further comprising:
- means for receiving a request at a routing engine from a call control element to determine the plurality of alternative routes associated with the termination point.

* * * * *